United States Patent
Cucco et al.

(10) Patent No.: US 8,578,460 B2
(45) Date of Patent: Nov. 5, 2013

(54) AUTOMATING CLOUD SERVICE RECONNECTIONS

(75) Inventors: John B. Cucco, Redmond, WA (US); Veniamin Rybalka, Bellevue, WA (US); Ulric Dihle, Seattle, WA (US); Larry Draper, Bothell, WA (US); Kanika Agrawal, Sammamish, WA (US); Tony Chan, Lynnwood, WA (US); Guruprakash Rao, Redmond, WA (US); Ashwin Chandra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 88 days.

(21) Appl. No.: 13/205,308

(22) Filed: Aug. 8, 2011

(65) Prior Publication Data
US 2012/0304262 A1 Nov. 29, 2012

Related U.S. Application Data

(60) Provisional application No. 61/489,215, filed on May 23, 2011.

(51) Int. Cl.
H04L 29/00 (2006.01)
(52) U.S. Cl.
USPC ............ 726/6; 713/155; 713/156; 713/157; 713/158; 713/159
(58) Field of Classification Search
USPC .................................. 713/155–159
See application file for complete search history.

(56) References Cited

U.S. PATENT DOCUMENTS

| 7,096,392 | B2 | 8/2006 | Sim-Tang |
| 2009/0228950 | A1* | 9/2009 | Reed et al. ................. 726/1 |
| 2009/0228967 | A1 | 9/2009 | Gbadegesin et al. |
| 2010/0217850 | A1 | 8/2010 | Ferris |
| 2010/0319004 | A1 | 12/2010 | Hudson et al. |
| 2010/0325199 | A1* | 12/2010 | Park et al. ................. 709/203 |
| 2011/0010339 | A1 | 1/2011 | Wipfel et al. |

(Continued)

FOREIGN PATENT DOCUMENTS

WO 2009127904 A1 10/2009

OTHER PUBLICATIONS

Liebing, Edward A., "Disconnecting NetWare Clients that Have Automatic Reconnection Enabled", Retrieved at <<http://support.novell.com/techcenter/articles/ana19970203.html>>, Feb. 1, 1997, pp. 5.

(Continued)

Primary Examiner — Ghazal Shehni
(74) Attorney, Agent, or Firm — Turk IP Law, LLC (57) ABSTRACT

Technologies are generally described for automatically reconnecting a security principal to cloud services through correlation of security principal identifier attributes. A new security principal for a user may be detected and automatically reconnected to the user's cloud based services. An administrator for the security domains may specify a value of a unique security principal metadata attribute for the original security principal in a customizable security principal metadata attribute in the new security principal in the same or new security domain. A secondary verification metadata attribute may optionally be specified to ensure the correct security principal is reconnected to the user's cloud based resources. The correlation between the original security principal for the user and the new security principal may be used to reconnect the user's cloud resources.

19 Claims, 8 Drawing Sheets

(56) References Cited

U.S. PATENT DOCUMENTS

2011/0016214 A1  1/2011  Jackson
2011/0047540 A1  2/2011  Williams et al.
2011/0099266 A1  4/2011  Calder et al.
2012/0054253 A1* 3/2012  Guarraci .................. 707/825

OTHER PUBLICATIONS

"International Search Report", Mailed Date: Oct. 29, 2012, Application No. PCT/US2012/038874, Filed Date: May 21, 2012, pp. 8.

* cited by examiner

AUTOMATING CLOUD SERVICE RECONNECTIONS

CROSS REFERENCE TO RELATED APPLICATIONS

This application claims the benefit of U.S. Provisional Patent Application Ser. No. 61/489,215 filed on May 23, 2011. The disclosures of the provisional patent application are hereby incorporated by reference for all purposes.

BACKGROUND

Cloud based services such as Active Directory® by Microsoft Corp. of Redmond, Wash. utilize a considerable number and variety of objects, of which, security principal accounts are one. Security principal accounts are objects that are assigned unique identifiers and are used in authentication and security mechanisms. A security principal account may be defined as a user account, group account, or computer account and may be assigned permissions to access certain network resources or other objects, and to perform certain actions on these objects.

There are times when a security principal representing a user may need to be reconnected to its cloud resources. This reconnection may be necessary due to a change of security principal's security domain or directory, an accidental deletion and recreation of the security principal, or comparable conditions. Some example scenarios may include forest consolidation, IT restructuring, corporate mergers or reorganizations, changes in employee status (e.g., contractor becoming full-time or the reverse), accidental deletion of the original security principal in a security group, etc.

Conventional systems tend to have a strict link between the security principal and the user's cloud resources. For the above-discussed example scenarios, the link would need to be manually reconnected to a new security principal, which may lead to a costly manual process, downtime for the user and may be prone to mistakes (reconnecting a user to the wrong resources in the cloud).

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatically reconnecting a security principal to cloud services through correlation of security principal identifier attributes. A new security principal (whether caused by a migration to a new security domain or accidental deletion and recreation of the security principal itself) for a user may be detected and automatically and safely reconnected to the user's cloud based services. According to some embodiments, an administrator for the security domains may specify a value of a unique security principal metadata attribute for the original security principal in a customizable security principal metadata attribute in the new security principal in the same or new security domain. Optionally, a secondary verification metadata attribute may be specified to ensure the correct security principal is reconnected to the user's cloud based resources. The correlation between the original security principal for the user and the new security principal (in the same security domain, if the result of an accidental deletion or a new security domain, if the result of a migration) may be used to reconnect the user's cloud resources.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, to reconnect a user's cloud based services, an administrator for the security domains may specify a value of a unique security principal metadata attribute for the original security principal in a customizable security principal metadata attribute in the new security principal in the same or new security domain. The correlation between the original security principal for the user and the new security principal may be used to reconnect the user's cloud resources. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing secure cloud based services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
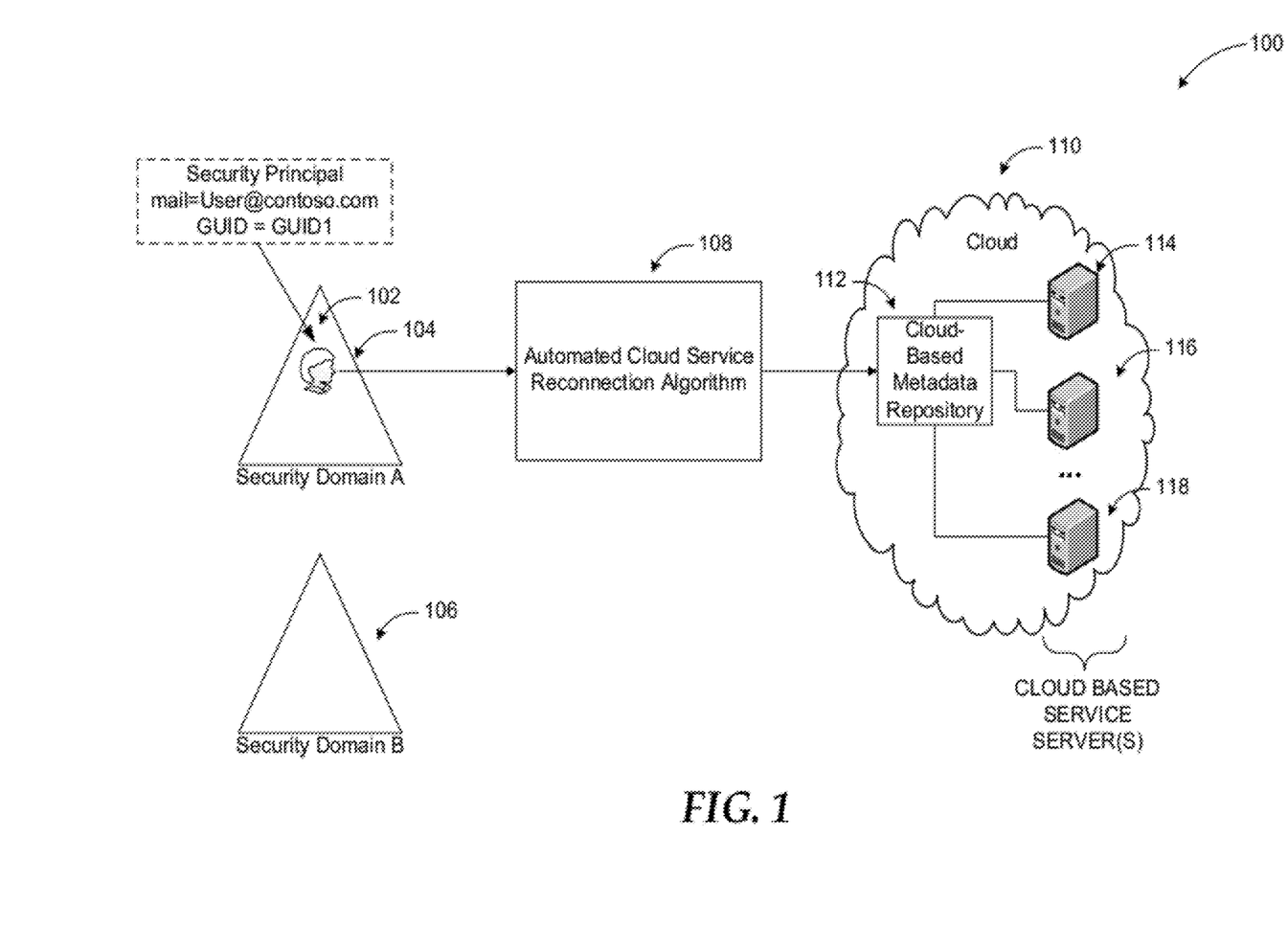
FIG. 1 illustrates an example scenario, where a user is connected to cloud based services through a security principal with a unique security principal metadata attribute.

FIG. 1 illustrates an example scenario, where a user is connected to cloud based services through a security principal with a unique security principal metadata attribute. Cloud based services such as Active Directory® by Microsoft Corp. of Redmond, Wash. utilize a considerable number and variety of objects, of which, security principal accounts are one. Security principal accounts are objects that are assigned unique security identifiers (SIDs), and are therefore used in authentication and security mechanisms. A security principal account may be defined as a user account, group account, or computer account that is assigned a SID, and may also be assigned permissions to access certain network resources or other objects, and to perform certain actions on these objects. The SID may be used to identify the user, group or computer. Access to various objects may be controlled through granting permissions or denying permissions to security principals. A permission may be defined as the ability to access and perform an action(s) on an object. Permissions to an object are granted or denied by administrators, or by the owner of the particular object. The security settings that are defined for a user, group, or computer determine and control whether the particular security principal account has access to cloud based services, client computers, member servers, domain controllers, applications, and other network resources and services.

As mentioned above, common cloud service objects that are regarded as security principal accounts may include the following: (1) User accounts: these are objects which uniquely identify network users. A user account enables a user to log on to the domain and to access resources. A local user account enables a user to log on to a computer and access local resources on that particular computer. A domain user account enables a user to log on to a domain, and access network resources. Built-in user accounts are typically used for administrative tasks. (2) Groups: security groups may be regarded as security principals. By bundling users into security groups, an administrator can manage security permissions for the members of the group as a single entity. (3) Computer accounts: computer accounts are typically used for authentication because they identify those client computers that belong to a domain. Some common characteristics of security principal accounts include assigning permissions to security principal accounts so that the users, group, or computers can access network resources; granting user rights to security principal accounts; and use of auditing to track the actions of users, groups, or computers.

As shown in diagram 100, a user 102 may be connected to one or more cloud based services as part of a security domain 104. The services in the cloud 110 may be provided by one or more servers 114, 116, 118, etc. The services may be coordinated through a cloud based metadata repository 112. Security for the user's connection to the cloud based services may be accomplished through the use of a security principal object, which may include a number of metadata attributes. Some of those attributes may include unique identifier attributes such as user's email address or a global unique identifier (GUID). In the example scenario, the security principal for user 102 includes the user's email address and his/her GUID (GUID1).

Figure 2:
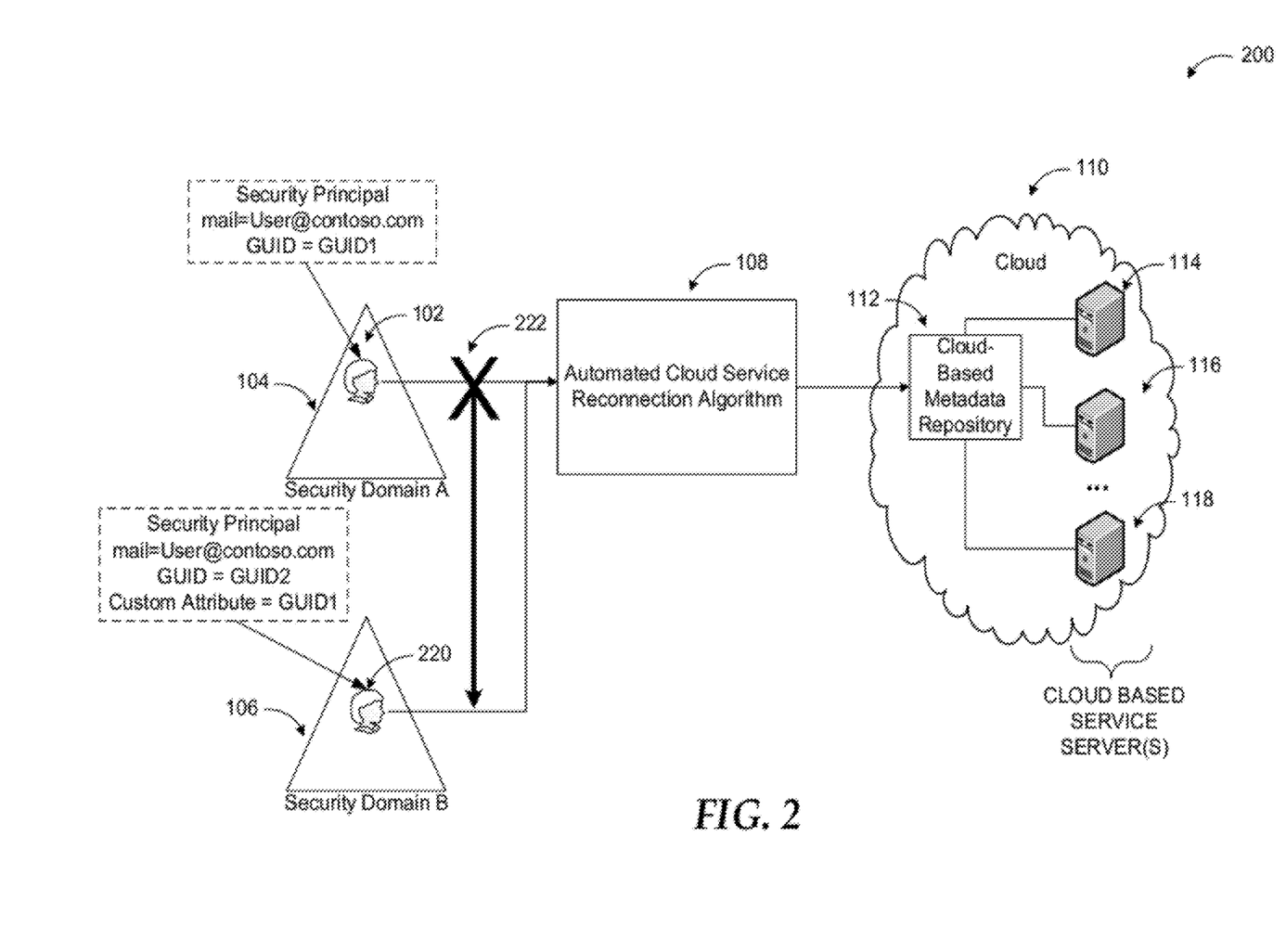
FIG. 2 illustrates how the user of FIG. 1 may be reconnected to the cloud based services in another security domain through a new security principal according to some embodiments.

FIG. 2 illustrates in diagram 200 how the user of FIG. 1 may be reconnected to the cloud based services in another security domain through a new security principal according to some embodiments. In an environment, in which there are one or more security domains (e.g., security domains 104 and 106) and cloud-based services for the security principals in the security domains, security principals in the security domains may be synchronized (metadata synchronized to the cloud resources) and provisioned (provided with a cloud-based resource or resources) with the cloud-based services.

When a security principal (e.g., for user 102) is moved (222) from one security domain 104 to another security domain 106, a new security principal 220 may be created in the destination domain to represent the user. To create a correlation between the two security principals in the two security domains, the new security principal's custom metadata attribute may be set to the unique metadata attribute (e.g., GUID) of the source security principal (e.g., specified as a string) by an automated cloud service reconnection algorithm 108. According to other embodiments, secondary verification criteria may also be specified to ensure that the new security principal 220 correlates to the correct security principal in the source security domain 104. The secondary verification criteria may be any unique security principal metadata attribute, such as an email address/alias or employee ID.

The automated cloud service reconnection algorithm 108 may control the transfer of the connection to the user's cloud resources, from the security principal in the source security domain 104 to the security principal 220 in the destination security domain 106. When the security principal in the destination security domain 106 is brought into visibility of the algorithm, the security principal in the destination security domain 106 may have the GUID of the security principal in the source security domain 104 and the secondary verification criteria matches between the two security principals, the connections between the security principal in the source security domain to the user's cloud resources may be moved to the security principal in the destination security domain 106. From this point on, the security principal in the destination security domain 106 may control access to the user's cloud resources. The original security principal in the source security domain 104 may then be removed without affecting the overall user's access to his or her cloud resources. This allows the cross security domain migrations to occur without any manual or external intervention lowering the cost to support these requests. Any potential downtime for the user to access their cloud resources may be minimized, because the algorithm ensures that the user's cloud-based services are always be accessible to either the authentication for the original security principal or the new security principal.

Figure 3:
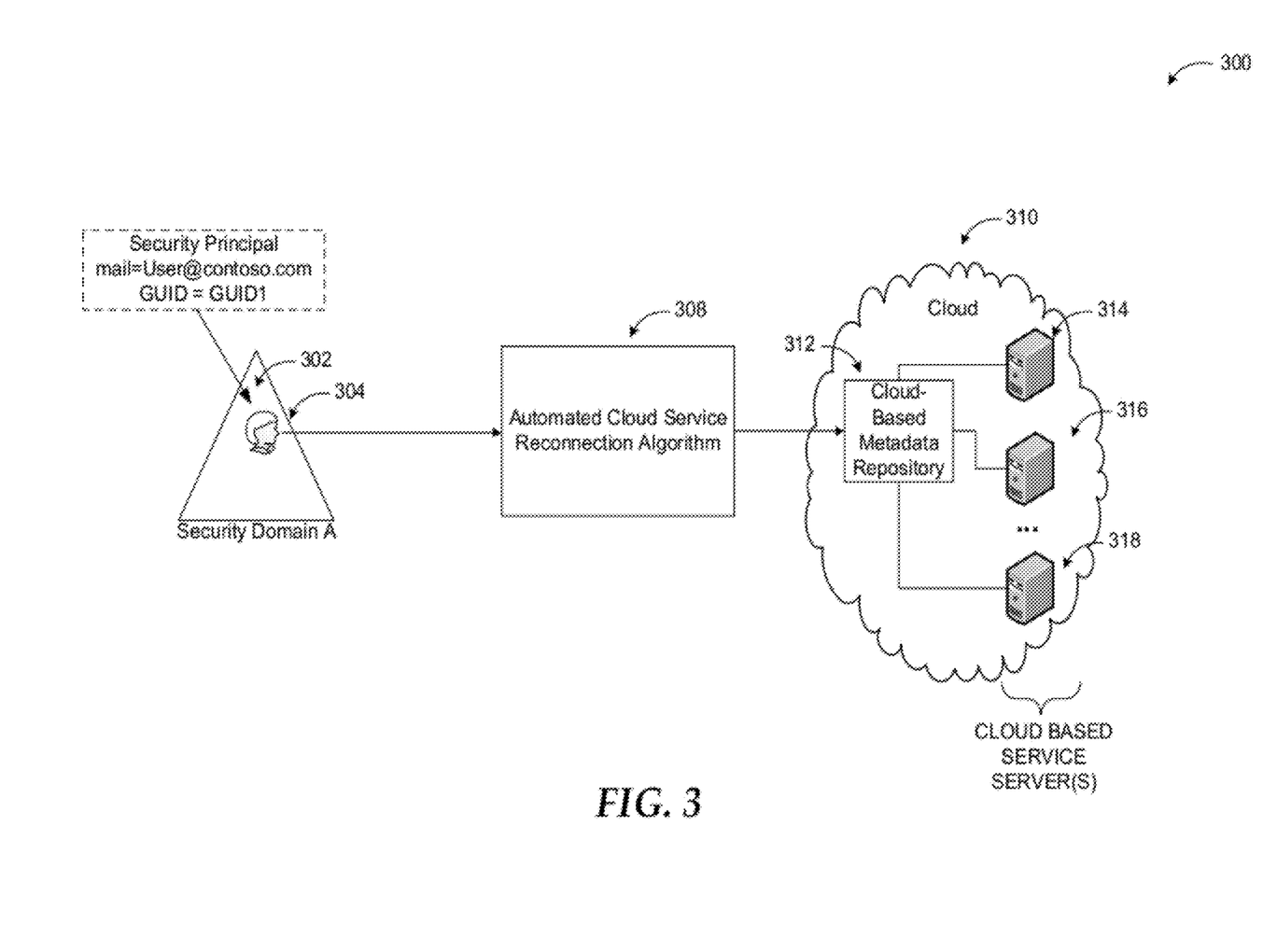
FIG. 3 illustrates another example scenario, where a user is connected to cloud based services through a security principal with a unique security principal metadata attribute.

FIG. 3 illustrates another example scenario, where a user is connected to cloud based services through a security principal with a unique security principal metadata attribute. Diagram 300 shows, similar to FIG. 1, a user connected to one or more cloud based services as part of a security domain 304. The services in the cloud 310 may be provided by one or more servers 314, 316, 318, etc. The services may be coordinated through a cloud based metadata repository 312. Security for the user's connection to the cloud based services may be accomplished through the use of a security principal 302, which may include a number of metadata attributes. Some of those attributes may include unique identifier attributes such as user's email address or a global unique identifier (GUID). In the example scenario, the security principal 302 for the user includes the user's email address and his/her GUID (GUID1).

In addition to enabling correlation of two different security principals in different security domains or directories and determination of which security principal should be connected to the user's cloud resources, a system according to embodiments may also have the ability to recreate a security principal (e.g., if the original has been accidentally deleted) and reconnect it to the user's cloud resources. Furthermore, a system according to embodiments may specify secondary verification criteria (e.g., a unique metadata attribute) to ensure that the new security principal is the correct security principal to reconnect to the user's cloud resources.

Figure 4:
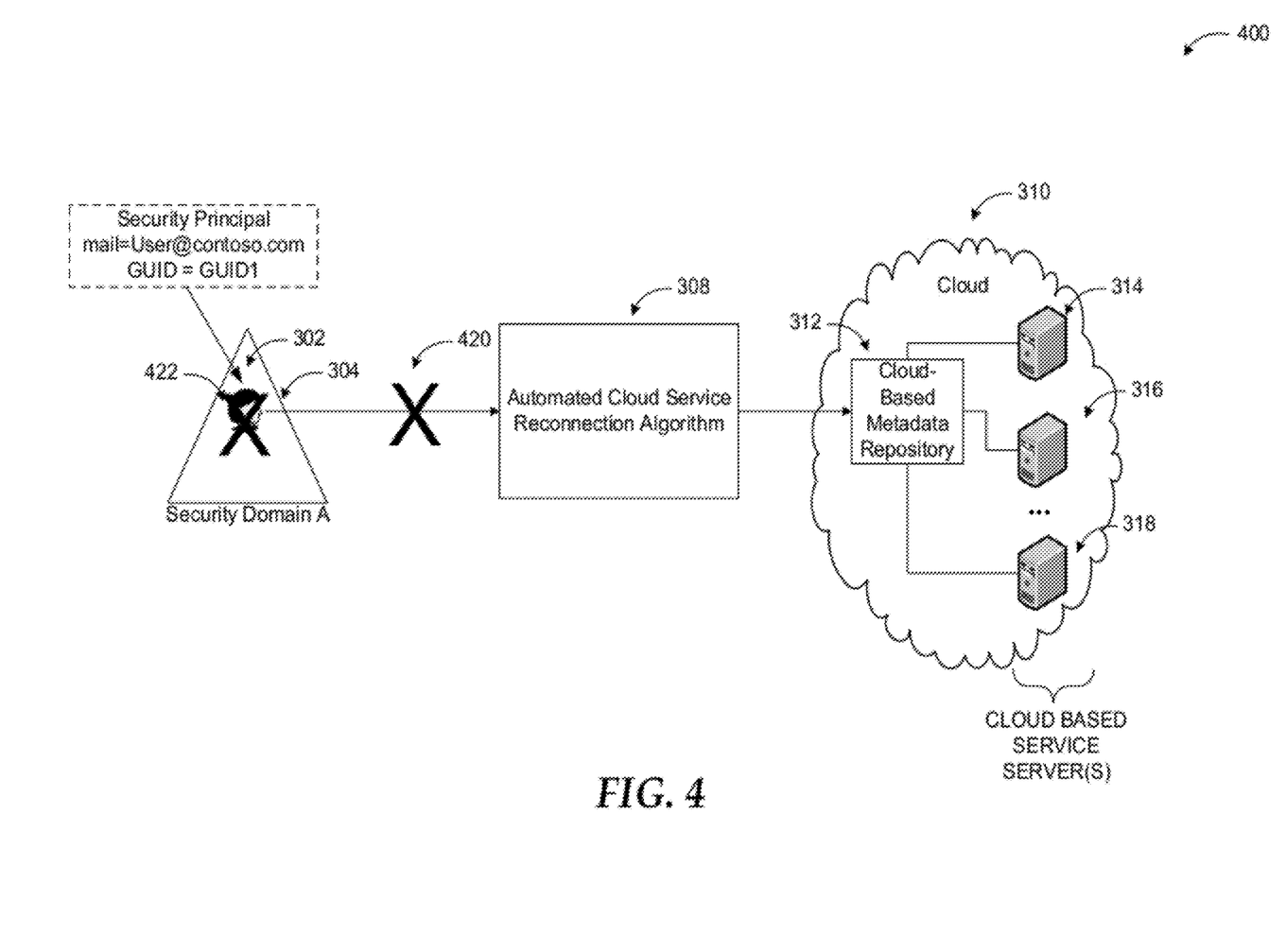
FIG. 4 illustrates how the user of FIG. 3 may be disconnected from the cloud based services through accidental deletion or similar reason.

FIG. 4 illustrates how the user of FIG. 3 may be disconnected from the cloud based services through accidental deletion or similar reason. Diagram 400 shows how the user of FIG. 3 may be disconnected from their cloud services, for example, by accidental deletion (422) of the security principal 302 from the security domain 304.

Automated cloud service reconnection algorithm 308 may have already stored the original security principal's metadata attributes (e.g., email address and/or GUID), however, and may use them to restore the services to the user by creating a new security principal as discussed below.

Figure 5:
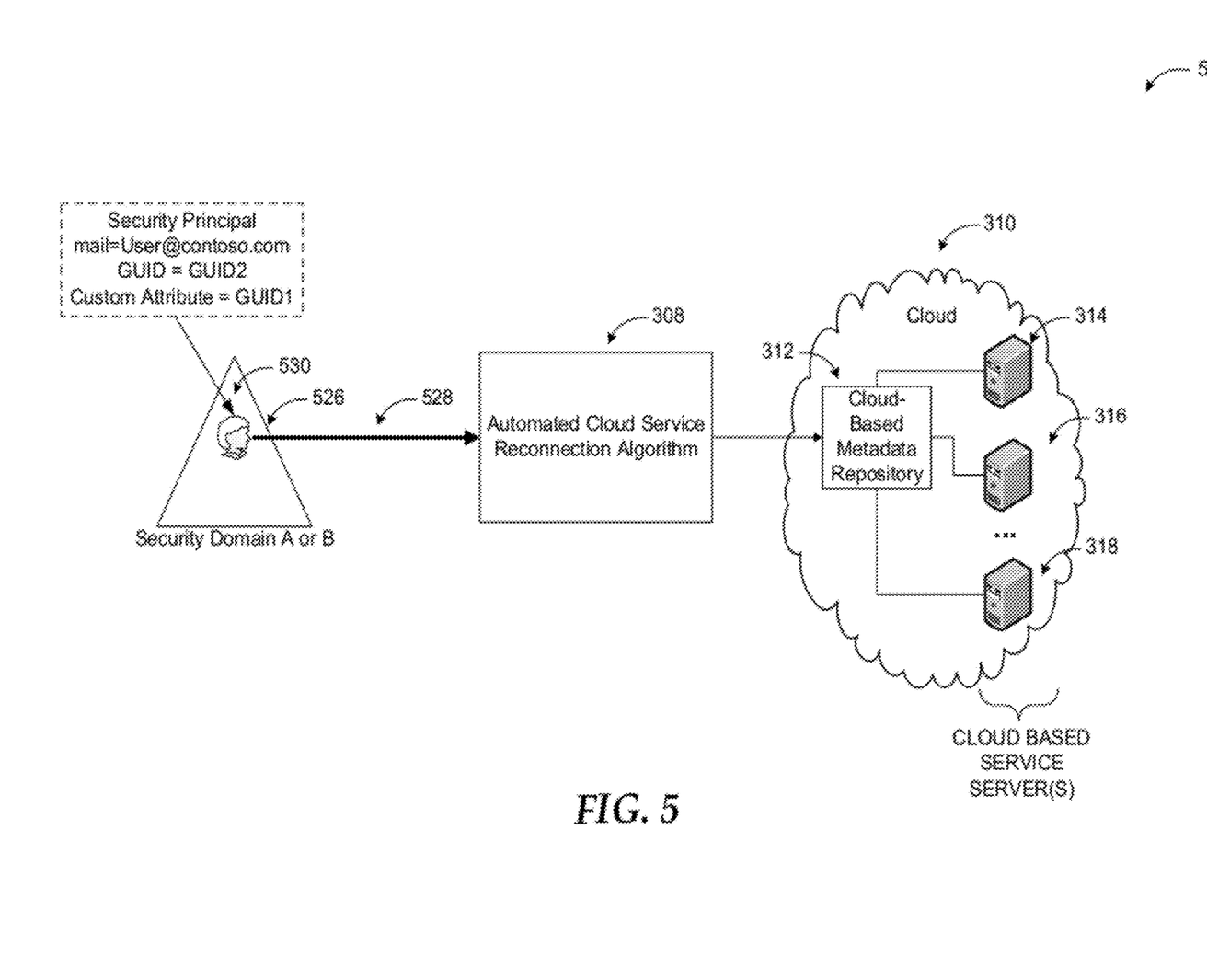
FIG. 5 illustrates how the user of FIG. 4 may be reconnected to the cloud based services in the same security domain through a new security principal according to other embodiments.

FIG. 5 illustrates how the user of FIG. 4 may be reconnected to the cloud based services in the same security domain through a new security principal according to other embodiments. As shown in diagram 500, new security principal 530 may be created for the original deleted security principal 302 in the security domain 526, which may be the same or different from the original security domain 304. The security principal's custom metadata attribute may be set to the original security principal's unique metadata attribute. Since the secondary verification criteria (for example, email address) is identical between the original security principal 302 and the new security principal 530, the connection 528 to the user's cloud resources may be restored automatically without affecting the user.

Automated cloud service reconnection algorithm 308 may seamlessly and automatically reconnect the new security principal created to replace the original, accidentally deleted security principal in the security domain. This process occurs automatically without any manual or external intervention lowering the cost to support these requests.

A system according to embodiments ensures that the user's cloud-based services are reconnected to the correct security principal via the use of the secondary verification criteria described above. Moreover, potential user errors (e.g., specifying an incorrect objectGUID in the custom metadata attribute or failing the secondary verification criteria) may be foreseen and a seamless method to recover from these errors may be provided.

If any security principal in a security domain is removed from the visibility of the algorithm, the user's corresponding cloud resources may be marked as pending deletion for a customizable amount of time. This may enable the security principal in a destination security domain to be reconnected to the user's cloud resources (in the case of a cross security domain migration) or a new security principal in the original security domain (in the case of an accidental deletion of the original security principal) provided that the original security principals unique attribute is specified in the custom metadata attribute of the new security principal and the secondary verification criteria is met.

The example systems in FIG. 1 through 5 are shown with specific components, exchanges, and configurations. Embodiments are not limited to systems according to these example configurations. Automatically reconnecting users to their cloud services using security principal attributes may be implemented in configurations employing fewer or additional components in applications and user interfaces.

Figure 6:
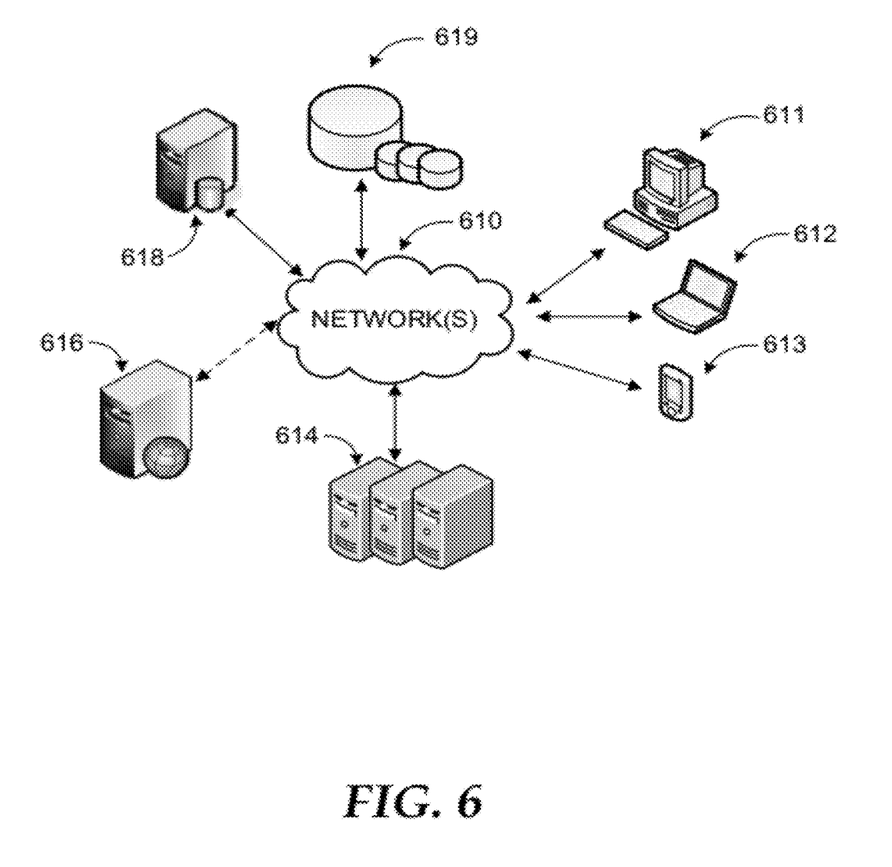
FIG. 6 is a networked environment, where a system according to embodiments may be implemented.

FIG. 6 is a networked environment, where a system according to embodiments may be implemented. A system providing automatic reconnection of cloud based services may include one or more applications executed over one or more servers 614 or a single server 616 such as a hosted service. The application(s) may communicate generic or special purpose client applications (e.g., browsers or locally installed specialized clients). Client applications on individual computing devices such as a smart phone 613, a laptop computer 612, or desktop computer 611 ('client devices') may enable access to cloud based services through network(s) 610.

As discussed above, a new security principal (whether caused by a migration to a new security domain or accidental deletion and recreation of the security principal itself) for a user may be detected and automatically and safely reconnected to the user's cloud based services. An administrator for the security domains may specify a value of a unique security principal metadata attribute for the original security principal in a customizable security principal metadata attribute in the new security principal in the same or new security domain. The correlation between the original security principal for the user and the new security principal (in the same security domain, if the result of an accidental deletion or a new security domain, if the result of a migration) may be used to reconnect the user's cloud resources. The server(s) may retrieve or store relevant data from/to data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to automatically reconnect users to their cloud services. Furthermore, the networked environments discussed in FIG. 6 are for illustration purposes only. Embodiments are not limited to the example applications, modules, or processes.

Figure 7:
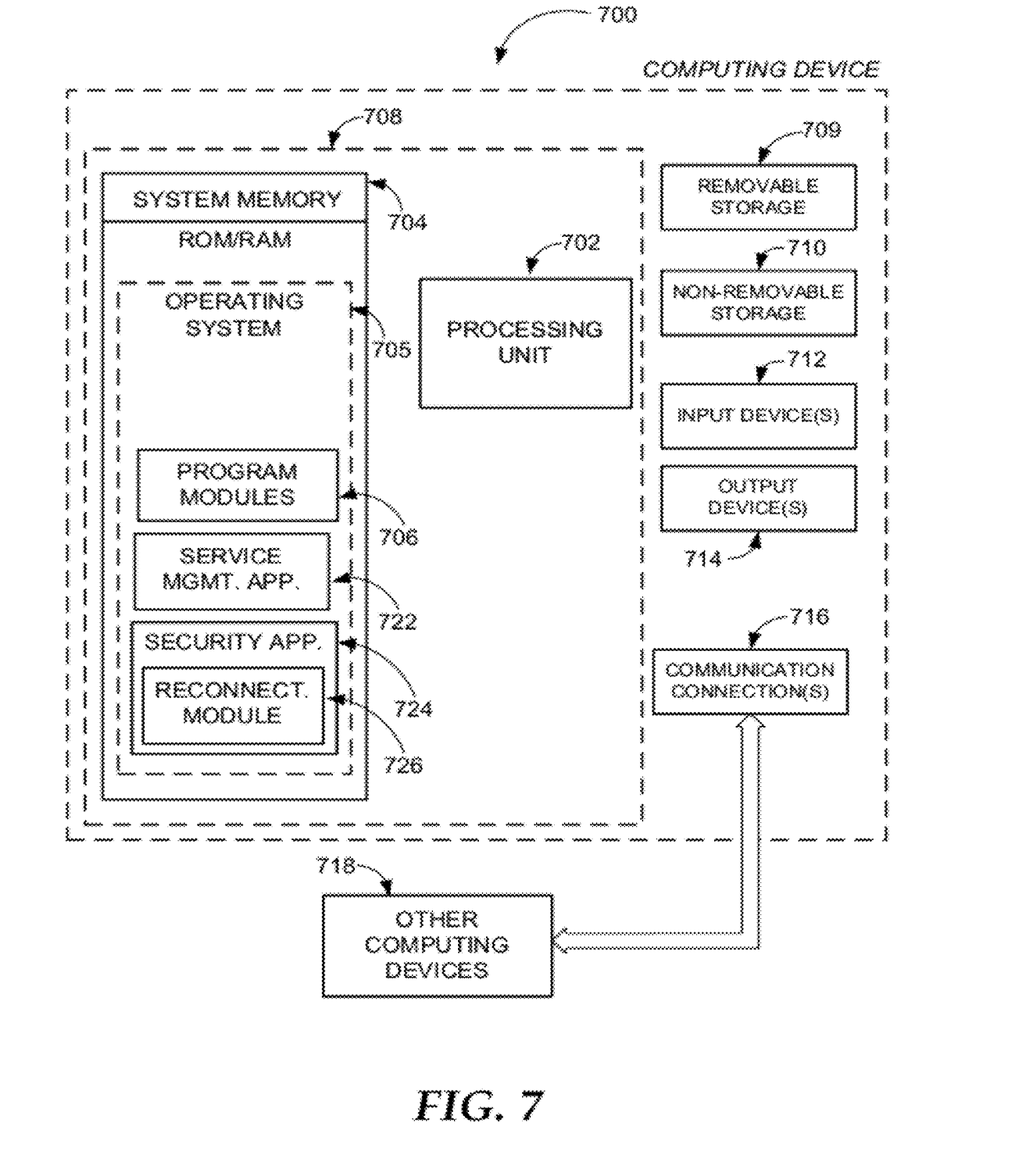
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, cloud service management application 722, security application 724, and reconnection module 726.

Cloud service management application 722 may provide administrative services for one or more cloud based service providers. These may include, but are not limited to, hosting of services, maintenance, statistical analysis, user assistance, and so on. Security application 724 may manage security and privacy aspects of the cloud service(s) such as maintenance of user credentials and permissions, migration of users and groups, and similar tasks. Reconnection module 726, which may be a distinct application of an integrated module of security application 724, may enable automatic reconnecting of users to cloud services upon migration, accidental deletion, or similar scenarios, using security principal identifier attributes as discussed above. This basic configuration is illustrated in FIG. 7 by those components within dashed line 708.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 700 may also contain communication connections 717 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 717 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
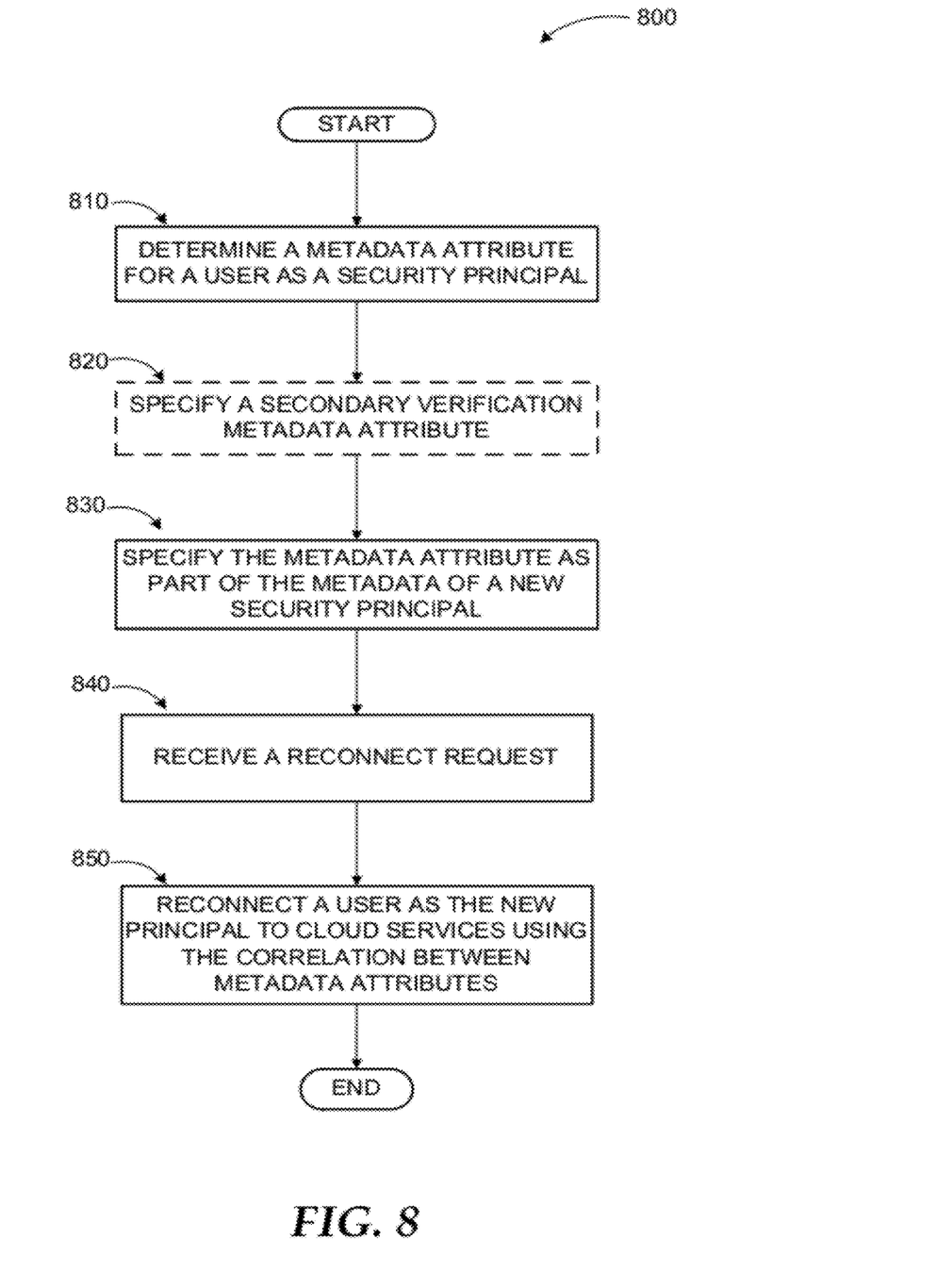
FIG. 8 illustrates a logic flow diagram of a process for automatically reconnecting a user to cloud services using a correlation between original security principal attributes and new security principal attributes according to embodiments.

FIG. 8 illustrates a logic flow diagram of process 800 for automatically reconnecting a user to cloud services using a correlation between original security principal attributes and new security principal attributes according to embodiments. Process 800 may be implemented by a server running independently or by a server managing one or more cloud based services.

Process 800 may begin with operation 810, where a unique security principal metadata attribute is determined for a security principal. The attribute may be any unique identifier such as a GUID. At optional operation 820, a secondary verification metadata attribute may be employed such as an email alias, employee identifier, or similar attribute to validate the user/security principal. The system may create a new security principal (in the same security domain or a different security domain depending on the scenario) and specify a value of the unique security principal metadata attribute for the original security principal in a customizable security principal metadata attribute in the new security principal at operation 830.

Upon receiving a request for reconnecting the user associated with the security principal (e.g., change of security domain, accidental deletion of the security principal, etc.) at operation 840, the system may reconnect the user's cloud resources at operation 850 based on the correlation between the original security principal for the user and the new security principal (in the same security domain, if the result of an accidental deletion or a new security domain, if the result of a migration).

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 800 are for illustration purposes. Automatically reconnecting cloud services may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

The invention claimed is:

1. A method executed on a computing device for automatically reconnecting a user to cloud based services, the method comprising:
    determining a first metadata attribute for a security principal managing access to a cloud based service at a source domain for the user;
    creating a new security principal for the user at a destination domain;
    specifying a value of the first metadata attribute for the security principal in a customizable metadata attribute in the new security principal;
    receiving a request for reconnecting the user to the cloud based service; and
    reconnecting the user to the cloud based service using a correlation between the first and the customizable metadata attributes of the security principal and the new security principal, wherein the correlation is created by setting the value of the customizable metadata attribute for the new security principal to be the same as the first metadata attribute of the security principal as part of a an automated cloud reconnection process controlling a transfer of connection from the security principal in the source domain to the new security principal in the destination domain.

2. The method of claim 1, wherein the first metadata attribute is a unique attribute.

3. The method of claim 2, wherein the first metadata attribute is one from a set of: a global unique identifier (GUID), an email address, an account number, and an employee identifier.

4. The method of claim 1, further comprising:
    creating the new security principal in response to deletion of the security principal.

5. The method of claim 1, wherein the request for reconnecting the user is in response to a migration of the user to a new security domain from an original security domain.

6. The method of claim 5, further comprising:
    upon connecting the user to the new security domain, automatically removing the user's cloud based service access from the security principal.

7. The method of claim 1, further comprising:
    performing a secondary verification employing a second metadata attribute.

8. The method of claim 7, wherein the second metadata attribute is one from a set of a global unique identifier (GUID), an email address, an account number, and an employee identifier, but not the same as the first metadata attribute.

9. The method of claim 7, further comprising:
    if the secondary verification fails, not connecting the new security principal and leaving the security principal connected to the cloud based services.

10. The method of claim 1, further comprising:
    if the security principal is removed from visibility of a security domain, marking the cloud based service of the corresponding user as pending deletion for a customizable period of time.

11. A computing device for managing cloud based services with automatic reconnection, the computing device comprising:
    a memory storing instructions; and
    a processor executing a security management application in conjunction with the stored instructions, the security management application configured to:
        determine a first metadata attribute for a security principal managing access to a cloud based service for a user;
        create a new security principal for the user;
        specify a value of the first metadata attribute for the security principal in a customizable metadata attribute in the new security principal;
        receive a request for reconnecting the user to the cloud based service in response to one of: a migration of the user from an original security domain to a new security domain and a deletion of the security principal;
        reconnect the user to the cloud based service using a correlation between the first and the customizable metadata attributes of the security principal and the new security principal at an automated cloud service reconnection module, wherein a new security principal's customizable metadata attribute is set to a unique value of the first metadata attribute by the automated cloud service reconnection module;
        if any security principal in the original security domain is removed from visibility of the automated cloud service reconnection module, mark the cloud based services as pending deletion for a customizable period of time to enable one of: reconnection of the security principal in a destination domain to the cloud based service in a case of the migration and reconnection of the new security principal in a source domain in the case of an accidental deletion of the security principal; and
        if the request for reconnecting is in response to the migration of the user to the new security domain, automatically remove the user from the original security domain upon connecting the user to the new security domain.

12. The computing device of claim 11, wherein the security management application is further configured to:
    perform a secondary verification employing a second metadata attribute, wherein the first and second metadata attributes comprise two distinct ones from a set of: a global unique identifier (GUID), an email address, an account number, and an employee identifier.

13. The computing device of claim 12, wherein the first and second metadata attributes are specified as strings.

14. The computing device of claim 11, wherein the security management application is part of a hosted service managing the cloud based service.

15. The computing device of claim 11, wherein the request for reconnecting the user is as a result of at least one from a set of: forest consolidation, information technology organization restructuring, organizational merger, change in employee status, and accidental deletion of the original security principal in a security group.

16. A computer-readable storage device with instructions stored thereon for automatically reconnecting a user to cloud based resources, the instructions comprising:
   determining a metadata attribute for a security principal managing access to the cloud based resources coordinated through a cloud based metadata repository for the user;
   creating a new security principal for the user that includes at least one metadata attribute based on a second metadata attribute of an original security principal for the user at a source security domain;
   performing a secondary verification employing a third metadata attribute associated with an original security principal, wherein the third metadata attribute is a unique security principal attribute selected from one or more of: an email alias and an employee identifier, when a connection to the user's cloud resources is restored automatically without affecting the user;
   receiving a request for reconnecting the user to a destination security domain for the cloud based resources; and
   connecting the user to a new security domain based on a correlation between the at least one metadata attribute of the new security principal and the second metadata attribute of the original security principal if the secondary verification is successful.

17. The computer-readable storage device of claim 16, wherein the instructions further comprise:
   removing the original security principal from the source security domain without affecting the user's access to the cloud based resources.

18. The computer-readable storage device of claim 16, wherein the source security domain and the destination security domain are the same and the user is reconnected to the cloud based resources following an accidental deletion of the original security principal.

19. The computer-readable storage device of claim 16, wherein the original and new security principals are one of: a user account, a group account, and a computer account assigned permissions to access selected cloud based resources and to perform actions on the cloud based resources.

* * * * *